United States Patent [19]

Cohen

[11] 4,436,967

[45] Mar. 13, 1984

[54] TELEPHONE LOCK

[76] Inventor: Eric S. Cohen, c/o Cose Technology Corp., 15 E. 40th St., New York, N.Y. 10019

[21] Appl. No.: 357,306

[22] Filed: Mar. 11, 1982

[51] Int. Cl.³ .......................................... H04M 1/66
[52] U.S. Cl. .................................. 179/189 R; 70/172
[58] Field of Search .................. 179/189 R, 184, 185, 179/187, 188, 103; 70/172, DIG. 72, 163, 164, 166, 167, 168

[56] References Cited

U.S. PATENT DOCUMENTS

| | | | |
|---|---|---|---|
| 1,083,569 | 1/1914 | Van Hoevenberg | 179/189 R |
| 1,138,389 | 5/1915 | Luby | 179/189 R |
| 1,422,372 | 7/1922 | Pardee | 70/165 |
| 1,462,404 | 7/1923 | White | 70/165 |
| 1,591,192 | 7/1926 | Suporter | 70/171 |
| 1,760,977 | 6/1930 | Duffy | 70/231 |
| 1,898,053 | 2/1933 | Hook | 70/164 |
| 1,912,872 | 6/1933 | Trautner | 70/231 |
| 3,167,617 | 1/1965 | Gerhardt | 179/100 |
| 3,299,207 | 1/1967 | Cooke | 179/187 |

OTHER PUBLICATIONS

"Gas Cap Lock", J. C. Whitney & Co. Catalog, No. 326A, p. A.

Primary Examiner—G. Z. Rubinson
Assistant Examiner—L. C. Schroeder
Attorney, Agent, or Firm—Kirschstein, Kirschstein, Ottinger & Corbin

[57] ABSTRACT

A telephone lock for telephones of the type having apertured caps, each forming an annular external groove between the respective cap and the handset, includes a locking cup mountable over either or both of the caps, and a locking arrangement which includes a stationary locking element extending into the groove, and a movable locking element mounted on the locking cup for displacement between a retracted position and a locked position in which the movable locking element is located exteriorly of the groove and extends into the groove, respectively.

9 Claims, 3 Drawing Figures

U.S. Patent  Mar. 13, 1984  4,436,967
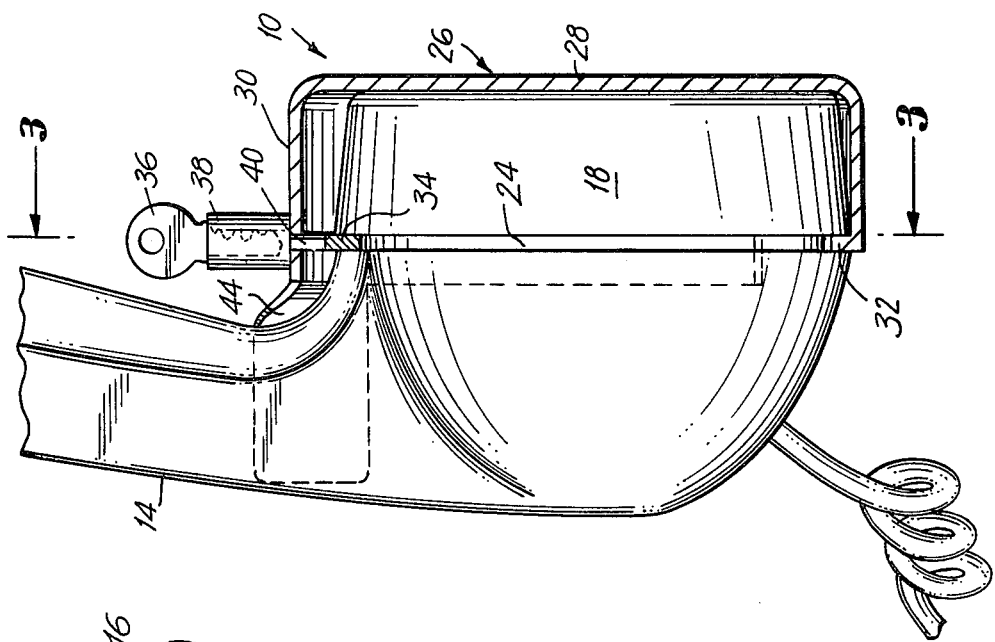
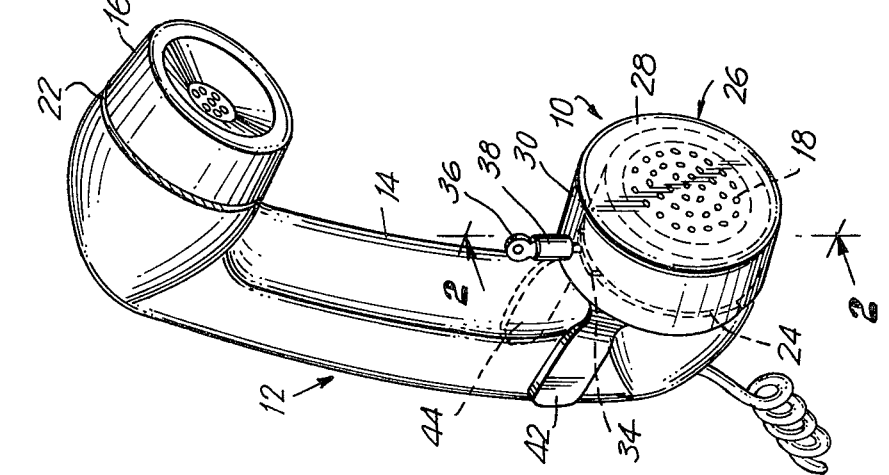

TELEPHONE LOCK

BACKGROUND OF THE INVENTION

1. Field of the Invention

This invention generally relates to telephone locks and, more particularly, to an arrangement for preventing unauthorized user access to one of the apertured caps mounted on the handset of the telephone.

2. Description of the Prior Art

In order to prevent unauthorized usage of a conventional telephone, it has been proposed to mount key-operated mechanical locks into one of the fingerholes of the rotary dial. Although generally satisfactory for their intended purpose, such dial-mounted locks cannot be used for pushbutton telephones having no dial.

SUMMARY OF THE INVENTION

Purposes of the Invention

Accordingly, it is the general object of this invention to overcome the drawbacks associated with the prior art telephone locks.

Another object of this invention is to provide a lock for telephones for both the dial- and the pushbutton-type.

Still another object of this invention is to provide a reliable locking arrangement for preventing unauthorized user across to either one or both of the apertured caps which are mounted on the handset.

Yet another object of this invention is to provide a locking arrangement which is easy to install over the transmitter cap and/or the receiver cap of the handset.

An additional object of this invention is to provide a locking arrangement which is easily removable from the transmitter and/or receiver caps of the handset.

Another object of this invention is to provide a locking arrangement which is easily interchangeable between pushbutton- and dial-type phones.

Still another object of this invention is to provide a handset-mounted lock for telephones which is simple in construction, inexpensive to manufacture, durable in use and being constituted of a minimum number of parts.

Brief Description of the Invention

In keeping with these objects and others which will become apparent hereinafter, one feature of the invention resides, briefly stated, in a lock for a telephone of the type having a pair of apertured caps threadedly mounted at opposite end regions of a conventional handset. One of the apertured caps is a mouthpiece cap which overlies the conventional microphone transmitter mounted within the handset. The other apertured cap is an ear cap which overlies the conventional receiver mounted within the handset. Each of these caps respectively forms an annular external groove between the cap and the handset, even when the respective cap is threaded fully onto the handset and tightened thereon to the maximum extent possible by hand-tightening.

The lock comprises a locking cup mountable over either or both of the caps, e.g. the mouthpiece cap. The locking cup has a shield portion adapted to overlie the apertures in the mouthpiece cap, and an annular skirt portion depending from the shield portion and covering the aforementioned groove formed by the mouthpiece cap. Means are provided for preventing sound from passing through the apertures in the mouthpiece cap when the locking cup is mounted thereon. Such sound-preventing means can constitute a separate sound-deadening acoustic element mounted in juxtaposed relationship underneath the shield portion, or, in a preferred embodiment, the shield portion can be made imperforate, thereby effectively blocking the sound.

The lock further comprises locking means including a stationary locking element and a manually-operated movable locking element. The stationary locking element is fixedly mounted on the skirt portion and extends into the associated groove at a predetermined location along the periphery thereof. In a preferred embodiment, the stationary locking element is an arcuate flange which extends along the circumferential direction over an arc length of less than 360°, and preferably less than 180°.

The movable locking element is mounted on the locking cup for displacement between a retracted position in which the movable locking element is located exteriorly of the groove, and a locked position in which the movable locking element extends into the groove and lockingly engages the mouthpiece cap at another location along the periphery of the groove which is spaced remotely from the predetermined location. A key-operated lock is operatively connected to the movable locking element to displace the latter between its positions. The movable locking element can either be a cylindrical pin, or, in a preferred embodiment, it constitutes an arcuate flange portion which extends circumferentially over an arc length less than 360°, and preferably less than 180°.

The groove is circular and includes a pair of semicircular groove portions, each having an arc length of 180°. The stationary and movable locking elements are, respectively, received in the groove portions so as to affirmatively prevent the locking cup from being removed from the mouthpiece cap. The locking engagement of the locking cup at two spaced apart locations at opposite sides of the mouthpiece cap reliably prevents an intruder from removing the locking cup.

In accordance with another feature of this invention, a pair of projections extend outwardly of the locking cup and, respectively, engage opposite sides of the handset. This feature reliably prevents an intruder from turning the locking cup in either circumferential direction in an attempt to gain access to the mouthpiece cap located underneath the locking cup.

The novel features which are considered as characteristic of the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWINGS

FIG. 1 is a perspective view of a lock mounted on a telephone in accordance with this invention;

FIG. 2 is a partially broken-away, partially sectioned, enlarged view as taken on line 2—2 of FIG. 1; and FIG. 3 is a side sectional view as taken on line 3—3 of FIG. 2.

DETAILED DESCRIPTION OF THE PREFERRED EMBODIMENT

Referring now to the drawings, reference numeral 10 generally identifies a telephone lock in accordance with this invention. As best shown in FIG. 1, a conventional telephone handset 12 includes an elongated handset body 14, an apertured receiving cap 16 juxtaposed over a telephone receiver within the handset body and adapted to be placed adjacent the ear of a user during use, and an apertured transmitting cap 18 juxtaposed over a telephone transmitter microphone 20 (FIG. 3) within the handset body and adapted to be placed adjacent the mouth of the user during use. The caps 16, 18 are threadedly mounted at opposite end regions of the handset body 14 and, even when fully hand-tightened thereon, the caps 16, 18 respectively form annular external circumferentially-complete grooves 22, 24 around the handset body.

The lock 10 comprises a locking cup 26 mountable over either cap 16 or 18. As shown in FIG. 2, the locking cup 26 includes an imperforate planar shield portion 28 for overlying the apertures in the mouthpiece cap 18, and an annular skirt portion 30 depending orthogonally from the shield portion 28 and covering the groove 24 to thereby prevent access to the same. The imperforate shield portion 28 prevents sound from passing through the apertures in the mouthpiece cap 18, thereby preventing the handset from being used.

The locking cup 26 is locked on the handset over the mouthpiece cap 26 by a stationary locking element 32 and a movable locking element 34. The stationary locking element 32 is of one-piece with the locking cup and is fixedly mounted on the skirt portion 30. The stationary locking element 30 extends into the groove 24 at a predetermined location along the periphery of the groove 24. The stationary locking element constitutes an arcuate flange located on the inner circumferential surface of the skirt portion 30, and extends circumferentially over an arc length less than 360°, and preferably about 90°.

The movable locking element 34 is mounted on the locking cup for displacement between a retracted nonlocking position in which the movable element 34 is located exteriorly of the groove, and an extended locked position in which the movable element 34 extends into the groove and lockingly engages the mouthpiece cap at another location along the periphery of the groove which is spaced remotely from the aforementioned predetermined location. The movable locking element may be a cylindrical pin, or preferably, an arcuate flange portion which extends circumferentially over an arc length less than 360°, and preferably about 30°. The locking elements 32, 34 extend into the groove 24 at two opposite sides thereof to thereby prevent an intruder from removing the locking cup from the mouthpiece cap.

The movable locking element 34 is moved between its positions by a key-operated lock which includes a key 36 and a locking cylinder 38 mounted on the skirt portion 30. The locking cylinder 38 has a reciprocable output shaft 40 operatively connected to the movable locking element 34. Turning of the key 36 in the cylinder 38 causes the shaft 40 and the movable element 34 mounted thereon to be linearly moved between the retracted and extended positions.

Anti-turning means are mounted on the locking cup 26 for preventing the same from being turned on the handset, and includes a pair of projections 42,44 extending orthogonally away from the shield portion 28. The projections 42,44 are located at opposite sides of the handset body and prevent the locking cup from being turned in either circumferential direction.

In use, the movable locking element 34 is initially retracted to its retracted position, and the locking cup 26 is mounted over the mouthpiece cap by first inserting the stationary locking element into a lower location of the groove 24. The projections 42, 44 engage opposite sides of the handset body 14 and automatically serve to properly position the stationary locking element into the lower location of the groove. Thereupon, the key is inserted into the locking cylinder 38 and turned, whereby the movable locking element 34 is displaced to its locked position within an upper location of the groove. The locking cup is now locked in place and prevents unauthorized use of the telephone, because the groove is inaccessible to an intruder, and the locking cup can neither be turned, nor removed from its locked position on the mouthpiece cap. The presence of the locking cup over the mouthpiece cap effectively prevents the intruder from speaking into the handset, thereby effectively disabling the telephone.

Analogously, the lock 10 described above can be locked over the receiving cap 16, rather than the mouthpiece cap 18, in which case the intruder is effectively prevented from hearing over the handset, and again disabling the telephone. Of course, a pair of locks 10 can each be mounted over the caps 16, 18 at the same time for even greater security.

The sound-blocking aspect of the imperforate shield portion 28 can be increased by providing a separate sound-absorbing acoustic disc underneath the shield portion.

It will be understood that each of the elements described above, or two or more together, may also find a useful application in other types of constructions differing from the types described above.

While the invention has been illustrated and described as embodied in a telephone lock, it is not intended to be limited to the details shown, since various modifications and structural changes may be made without departing in any way from the spirit of the present invention.

Without further analysis, the foregoing will so fully reveal the gift of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A lock for a telephone of the type having apertured caps threadedly mounted at opposite end regions of a handset, each cap forming an annular generally U-shaped, externally-open groove between the end face of the respective cap and the handset, said lock comprising:
  (a) a locking cup mountable over one of the caps, said locking cup having a shield portion for overlying the apertures in said one cap, and an annular generally cylindrical skirt portion depending from the shield portion and covering the groove formed by said one cap to thereby prevent across to the groove;
  (b) means for preventing sound from passing through the apertures of said one cap when the locking cup is mounted thereon; and (c) means on the locking cup for locking the same on said one cap, said locking means including a stationary locking element fixedly mounted on the skirt portion and extending into and within the groove a predetermined location along the periphery of the groove, and a manually-operated movable locking element mounted on the locking cup for displacement between a retracted position in which the movable locking element is located exteriorly of the groove, and a locked position in which the movable locking element extends into and within the groove and lockingly engages said one cap at another location along the periphery of the groove which is spaced remotely from said predetermined location, to thereby prevent unauthorized use of the telephone.

2. The lock as defined in claim 1, wherein said sound preventing means is incorporated into the locking cup, and constitutes an imperforate shield portion.

3. The lock as defined in claim 1, wherein the stationary locking element constitutes an arcuate flange located on the inner circumferential surface of the skirt portion, said arcuate flange extending circumferentially over an arc length less than 360°.

4. The lock as defined in claim 1, wherein the locking means includes a key-operated lock mounted on the skirt portion, and opertively connected to the movable locking element to displace the latter between its positions.

5. The lock as defined in claim 1, wherein the movable locking element includes an arcuate flange portion extending circumferentially over an arc length less than 360°.

6. The lock as defined in claim 1, wherein the groove constitutes a pair of semi-circular groove portions, each having an arc length of 180°, and wherein said stationary locking element is received in one of said groove portions, and wherein said movable locking element is received in the other of said groove portions.

7. The lock as defined in claim 1, and further comprising anti-turning means non-removably on the locking mounted on the locking cup for preventing turning of the same on the handset.

8. The lock as defined in claim 7, wherein the anti-turning means includes a pair of projections of one-piece with and extending away from the locking cup and being located at opposite sides of the handset.

9. A telephone lock for a telephone of the type having apertured caps threadedly mounted at opposite end regions of a handset, each cap forming an annular generally U-shaped, externally-open groove between the end face of the respective cap and the handset, said telephone lock comprising:
 (a) a locking cup mountable over one of the caps, said locking cup having a shield portion for overlying the apertures in said one cap, and an annular generally cylindrical skirt portion depending from the shield portion and covering the groove formed by said one cap to thereby prevent access to the groove;
 (b) means for preventing sound from passing through the apertures of said one cap when the locking cup is mounted thereon, said sound-preventing means being incorporated into the locking cup and constituting an imperforate shield portion;
 (c) means on the locking cup for locking the same on said one cap, said locking means including a stationary locking arcuate flange element fixedly mounted on the inner circumferential surface of the skirt portion and extending into and within the groove at a predetermined location along the periphery of the groove over an arc length less than 360°, a key-operated lock mounted on the skirt portion, and a manually-operated movable locking arcuate flange element mounted on the skirt portion and operatively connected to the lock for displacement between a retracted position in which the movable locking element is located exteriorly of the groove, and a locked position in which the movable locking element extends into and within the groove and lockingly engages said one cap at another location along the periphery of the groove over an arc length less than 360°, said other location being spaced remotely from said predetermined location, to thereby prevent unauthorized use of the telephone; and
 (d) anti-turning means non-removably mounted on the locking cup for preventing turning of the same on the handset, said anti-turning means including a pair of projections of one piece with and extending away from the locking cup, said projections being located at opposite lateral sides of the handset to prevent unauthorized removal of the locking cup.

* * * * *